(12) United States Patent
Hansen et al.

(10) Patent No.: US 10,360,190 B2
(45) Date of Patent: Jul. 23, 2019

(54) MIGRATE DATA IN A SYSTEM USING EXTENSIONS

(71) Applicant: Microsoft Technology Licensing, LLC, Redmond, WA (US)

(72) Inventors: Klaus Marius Hansen, Bagsværd (DK); Jesper Schulz, Køge (DK); Daniel Tabacaru, Valby (DK); Thomas Andersen, Charlottenlund (DK); Jennifer Ranz, West Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 446 days.

(21) Appl. No.: 15/169,562

(22) Filed: May 31, 2016

(65) Prior Publication Data
US 2017/0286413 A1 Oct. 5, 2017

Related U.S. Application Data

(60) Provisional application No. 62/316,049, filed on Mar. 31, 2016.

(51) Int. Cl.
*G06F 16/21* (2019.01)
*G06F 16/23* (2019.01)
(Continued)

(52) U.S. Cl.
CPC .......... *G06F 16/214* (2019.01); *G06F 3/0482* (2013.01); *G06F 3/04842* (2013.01); *G06F 16/2365* (2019.01); *G06F 16/258* (2019.01)

(58) Field of Classification Search
CPC ........................... G06F 3/0482; G06F 3/04847
(Continued)

(56) References Cited

U.S. PATENT DOCUMENTS 6,308,178 B1   10/2001  Chang et al.
7,072,913 B2    7/2006  Jans et al.
(Continued)

FOREIGN PATENT DOCUMENTS

CN      102521387 A    6/2012
WO     2004077215 A2   9/2004

OTHER PUBLICATIONS

Juve et al. ("Automating Application Deployment in Infrastructure Cloud"; Published in: 2011 IEEE Third International Conference on Cloud Computing Technology and Science Date of Conference: Nov. 29-Dec. 1, 2011; Date Added to IEEE Xplore: Jan. 19, 2012) (Year: 2012).*

(Continued)

*Primary Examiner* — Jay A Morrison
*Assistant Examiner* — Ken Hoang
(74) *Attorney, Agent, or Firm* — Workman Nydegger

(57) ABSTRACT

Facilitating migration of data from a first system format to a second system. A method includes, at an extension receiving an indication that the extension should be used for data migrations. The method further includes receiving a request from a migration coordinator for migration instructions. At the extension, the method further includes identifying whether or not migration instructions are available and if the migration instructions are available, then providing the instructions to the migration coordinator. At the extension, the method further includes identifying if information about loading data is available, and if information about loading data is available, providing the information about loading data to the migration coordinator. At the extension, the method further includes identifying if a template is specified for migrating data, and if a template is specified, identifying the template to the migration coordinator.

18 Claims, 14 Drawing Sheets

(51) Int. Cl.
*G06F 16/25* (2019.01)
*G06F 3/0482* (2013.01)
*G06F 3/0484* (2013.01)

(58) Field of Classification Search
USPC .............................................. 705/2; 709/203
See application file for complete search history.

(56) References Cited

U.S. PATENT DOCUMENTS

| | | | |
|---|---|---|---|
| 7,272,600 | B1 | 9/2007 | Singh |
| 7,509,327 | B2 | 3/2009 | Joshi et al. |
| 7,770,053 | B1 | 8/2010 | Bappe et al. |
| 7,937,698 | B2 | 5/2011 | Belisario et al. |
| 7,970,732 | B2 | 6/2011 | Jernigan et al. |
| 8,285,817 | B1 | 10/2012 | Balasubramanian et al. |
| 2001/0044795 | A1* | 11/2001 | Cohen ................ G06F 17/30699 |
| 2003/0037034 | A1* | 2/2003 | Daniels ................ G06Q 10/087 |
| 2004/0064487 | A1 | 4/2004 | Nguyen et al. |
| 2005/0055357 | A1* | 3/2005 | Campbell ................ G06F 8/61 |
| 2005/0149536 | A1 | 7/2005 | Wildes et al. |
| 2005/0256892 | A1 | 11/2005 | Harken |
| 2010/0161666 | A1* | 6/2010 | Do .................... G06F 17/30569 707/791 |
| 2011/0107327 | A1* | 5/2011 | Barkie ..................... G06F 8/63 717/176 |
| 2015/0128018 | A1 | 5/2015 | Hurlbut |
| 2015/0331923 | A1 | 11/2015 | Kim |

OTHER PUBLICATIONS

International Search Report and the Written Opinion issued in PCT Patent Application No. PCT/US2017/024400 dated Jun. 19, 2017.
"Information Design Tool User Guide", Published on: Jun. 13, 2014 Available at: http://help.sap.com/businessobject/product_guides/sbo41/en/sbo41sp4_info_design_tool_en.pdf.

* cited by examiner

DATA MIGRATION

Apply your Imported Data

| Selected | Table Name | | No. Of Records |
|---|---|---|---|
| ✓ | Customer | ... | 26 |
| ✓ | Vendor | ... | 28 |
| ✓ | Item | ... | 27 |

Choose Next to Start Applying Your Data

228

221 Advanced

Back

222 Next

Finish

Figure 2H

| HOME | ACTIONS | NAVIGATE | REPORT | | | | | | ? ⊗ |
|------|---------|----------|--------|---|---|---|---|---|---|
| New | Edit | View | Delete | Sales Quotes | Sales Invoice Sales Order Sales Credit Memo | Assign Tax Area | Open In Excel | | |
| New | | Manage | | | New Document | Functions | Page | | |

238

My Company

Customers +new

| | No. | | Name | Phone No. | Contact | Balance ($) | Balance Due ($) | Sales ($) |
|---|---|---|---|---|---|---|---|---|
| | 14 | ... | Chidester, Jim | 415-555-5239 | Chidester, Jim | 0.00 | 0.00 | 0.00 |
| | 15 | ... | Dunn, Eric C.W. | 415-555-3869 | Dunn, Eric C.W. | 0.00 | 0.00 | 0.00 |
| | 19 | ... | Reese, Pamela | 925-666-1234 | Reese, Pamela | 0.00 | 0.00 | 0.00 |
| | 21 | ... | Easley, Paula | 415-555-7311 | Easley, Paula | 0.00 | 0.00 | 0.00 |
| | 22 | ... | Jimenez, Cristina | 415-555-3977 | Jimenez, Cristina | 0.00 | 0.00 | 0.00 |
| | 23 | ... | Lamb, Brad | 415-555-6798 | Lamb, Brad | 0.00 | 0.00 | 0.00 |
| | 24 | ... | Lee, Laurel | 415-555-2174 | Lee, Laurel | 0.00 | 0.00 | 0.00 |
| | 26 | ... | Lew Plumbing – C | 555-415-4596 | Lew Plumbing – C | 0.00 | 0.00 | 0.00 |
| | 27 | ... | Lucchini, Bill | 415-555-0875 | Lucchini, Bill | 0.00 | 0.00 | 0.00 |
| | 28 | ... | Luke, Noelani | 415-555-0120 | Luke, Noelani | 0.00 | 0.00 | 0.00 |
| | 29 | ... | Milner, Eloyse | 414-555-9925 | Milner, Eloyse | 0.00 | 0.00 | 0.00 |
| | 30 | ... | Morgenthaler, Jenny | 555-415-0098 | Morgenthaler, Jenny | 0.00 | 0.00 | 0.00 |
| | 31 | ... | Morris, Katherine | 555-415-9010 | Morris, Katherine | 0.00 | 0.00 | 0.00 |
| | 32 | ... | Nguyen, Tuan | 414-555-3424 | Nguyen, Tuan | 0.00 | 0.00 | 0.00 |
| | 33 | ... | Oliveri, Tom | 415-555-4311 | Oliveri, Tom | 0.00 | 0.00 | 0.00 |
| | 34 | ... | Prentice, Adelaide | 555-415-6415 | Prentice, Adelaide | 0.00 | 0.00 | 0.00 |
| | 35 | ... | Rice, Linda | 925-666-0102 | Rice, Linda | 0.00 | 0.00 | 0.00 |
| | 36 | ... | Robson, Darci | 415-555-1181 | Robson, Darci | 0.00 | 0.00 | 0.00 |

Sell-To Customer Sales History

*Figure 2K*

MIGRATE DATA IN A SYSTEM USING EXTENSIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of and priority to U.S. Provisional Patent Application Ser. No. 62/316,049 filed on Mar. 31, 2016 and entitled "Migrate Data in a System Using Extensions," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Often, as part of adoption of a new system that replaces a previously used system (for example, moving from a previous enterprise resource planning (ERP) system to a new ERP system), data will need to be migrated from the previous system to the adopted system. This migration involves mapping data entities (such as customers, addresses, quantities) as well as ensuring data consistency after migration. In addition, in a multi-tenant system with a large number of different customers, customers may need migration from a large set of different systems. Mapping entities is specific to the previous system whereas data consistency is a property of the adopted system.

To write migration code as part of the base system leads to a large base system with many different migrations to account for the various systems to be migrated from. Additionally, allowing third parties to write migration code may lead to an inconsistent UI and/or user experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein may be practiced in a computing environment, and includes acts for migrating data from a first system format to a second system. The method includes providing in a user interface a set of extensions selectable by a user. The method further includes receiving user input selecting one of the provided extensions. For the selected extension the method further includes identifying an indicator that indicates whether or not migration instructions are provided and if the indicator indicates that migration instructions are provided, then the method further includes providing the instructions to a user in a unified instruction interface usable by any selected extension from the set of extensions. For the selected extension, the method further includes identifying functionality for loading data from data storage. For the selected extension, the method further includes identifying a template specified in the extension for migrating data. For the selected extension, the method further includes identifying an indicator that indicates whether or not settings are available for the identified template, and when settings are available for the identified template, the method further includes providing a settings interface to the user in a unified settings interface usable by any selected extension in the set of extensions to allow the user to enter settings for migrating data. The data is transformed into an intermediate format according to the template in view of any settings configured in the settings interface.

Another embodiment illustrated herein may be practiced in a computing environment. A method includes acts for facilitating migration of data from a first system format to a second system. The method includes, at an extension receiving an indication that the extension should be used for data migrations. The method further includes receiving a request from a migration coordinator for migration instructions. At the extension, the method further includes identifying whether or not migration instructions are available and if the migration instructions are available, then providing the instructions to the migration coordinator. At the extension, the method further includes identifying if information about loading data is available, and if information about loading data is available, providing the information about loading data to the migration coordinator. At the extension, the method further includes identifying if a template is specified for migrating data, and if a template is specified, identifying the template to the migration coordinator.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2H illustrates additional user interface details for facilitating data migration;

FIG. 2K illustrates additional user interface details for facilitating data migration;

DETAILED DESCRIPTION

Some embodiments illustrated herein implement a data migration framework that is event- and extension-based. One can write extensions that can be imported into the base system. These extensions will then appear in a data migration assisted setup based on an event protocol. Some embodiments may be implemented where migration uses an intermediate format for which extensions create data. For example, in some embodiments, the target data is in tables in a relational database. The intermediate format is data that describes in which table and which column values should be inserted. For example, there may be a table called "Item" in a base system. The intermediate format describes that a record with a specific item number and item description, etc., should be inserted into that table.

By using an eventing system, embodiments can implement an improved computing system by causing a consistent interface to be provided. In this way, users can navigate more quickly and efficiently than in computing systems having fragmented and inconsistent interfaces which result from third parties creating ad hoc solutions for data migration.

Note that additionally, some embodiments may result in an overall improved computing system with improved performance characteristics. In particular, user interaction tends to be one of the factors that causes large processor, memory, and storage usage in computing systems. Additionally, as users attempt to use the system to manually try to convert data, inefficient conversion processes coupled with high user interaction results. By providing a system that reduces user interaction and provides convenient data processing, the system is in fact more efficient and able to process more information than previous systems not incorporating elements of the present invention.

Figure 1:
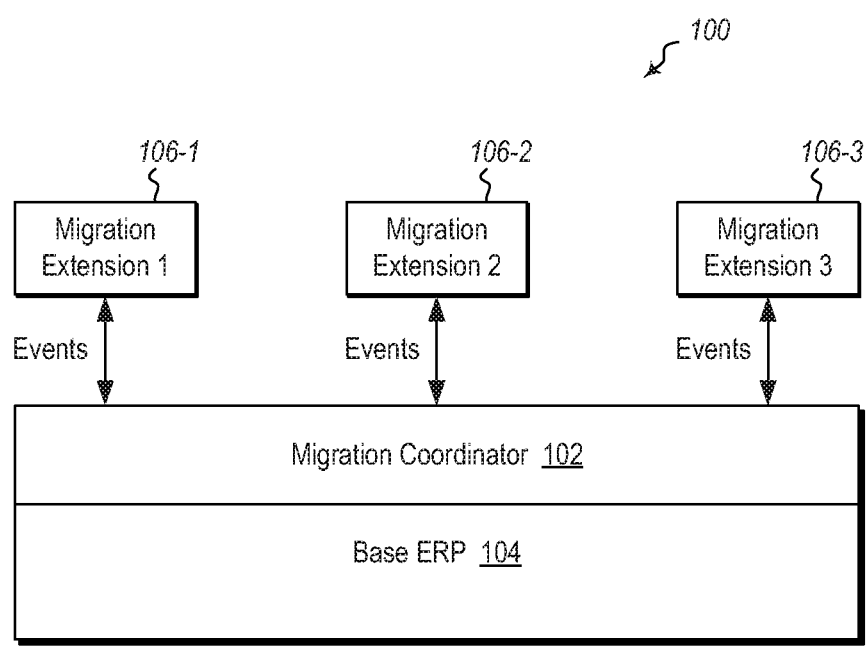
FIG. 1 illustrates a base system, the migration coordinator, and a number of migration extensions.

Referring now to FIG. 1, a system 100 is illustrated. The system 100 includes a migration coordinator 102 built into the base system 104. The migration coordinator 102 is responsible for coordinating data migration extensions, such as in the illustrated example: migration extension 106-1, migration extension 106-2, and migration extension 106-3.

An installed data migration extension will subscribe to events from the migration coordinator 102. When needed, the migration coordinator 102 will publish an event, or otherwise provide an indicator, asking for available data migrators available from the migration extensions. Data migrators subscribe to these events, or otherwise receive indicators and respond as appropriate. Additional information is also provided through the user interface of the migration coordinator 102 in this subscribe/publish way. Such additional information may include, for example, migration instructions provided from a migration extension to the migration coordinator 102 and displayed to a user, input received from a user through a user interface providing settings to the migration coordinator 102 which are then provided to a migration extension, identification of any data migrators from a migration extension to the migration coordinator 102, identification of a file to upload where the identification is received from a user through a user interface to the migration coordinator 102 which is then provided to a migration extension, identification of network addresses through which an Application programming Interface (API) for data import/export may be accessed, advanced settings from a user provided to the migration coordinator 102 through the user interface, etc.

A migration extension such as migration extension 106-3 will, when invoked to migrate data, deliver data in a common format (e.g., RapidStart configuration packages for Dynamics NAV available from Microsoft Corporation, of Redmond, Wash.). The migration coordinator 102 can use that data to perform the last steps of migration: importing the data and performing consistency checks. These checks are common to data migration extensions.

The following now illustrates code that can be used to implement the eventing system.

```
263 LOCAL [EventSubscriber] RegisterExcelDataMigrator
(VAR Sender: Record "Data Migrator Registration")
264
Sender.RegisterDataMigrator(GetCodeunitNumber,
DataMigratorDescritiopnTxt);
265
266 LOCAL [EvenSubscriber] HasSettings(VAR Sender: Record
"Data Migrator Registration"; VAR HasSettings : Boolean)
267 IF Sender, "No" <> GetCodeunitNumber THEN
268 EXIT;
269
270 |HasSettings := TRUE;
271
272 LOCAL [EventSubscriber] OpenSettings(VAR Sender : Record
"Data Migrator Registration";VAR Handled : Bolean)
273 IF Sender."No." <> GetCodeunitNumber THEN
274   EXIT;
275
276 PAGE.RUNMODAL (PAGE : : "Data Migration Settings");
277 Handled := TRUE;
278
279 LOCAL [EventSubscriber] ValidateSettings (VAR Sender : Record
"Data Migrator Registration")
280 IF Sender. "No." <> GetCodeunitNumber THEN
281   EXIT;
282
283 DataMigrationSetup.GET
284 IF (DataMigrationSetup. "Default Customer Template" = ' ') AND
285   (DataMigrationSetup. "Default Vendor Template" = ' ') AND
286   (DataMigrationSetup. "Default Item Template" = ' ') AND
287 THEN
288   IF NOT CONFIRM(SettingsMissingQst, TRUE) THEN
289     ERRORR (' ');
290
291 LOCAL [EventSubscriber] HasTemplate (VAR Sender : Record "Data
Migration Registration"; VAR HasTemplate : Boolean)
292 If Sender. "No." <> GetCodeunitNumber THEN
293   EXIT;
294
295 HasTemplate : = TRUE;
296
```

-continued

```
297 LOCAL [EventSubscriber] GetInstructions (VAR Sender : Record
"Data Migrator Registration"; VAR Instructions : Text;
VAR Handled : Boolean)
298 IF Sender. "No." <> GetCodeunitNumber THEN
299    EXIT;
300
301 CRLF := ' ' ;
302 CRLF[1] := 13;
303 CRLF[2] := 10;
304
305 Instructions := Instructino1Txt + CRLF + Instruction2Txt;
306
307 Handled := TRUE;
308
309 LOCAL [EventSubscriber] DownloadTemplate (VAR Sender :
Record "Data Migrator Registration"; VAR Handled : Boolean)
310 IF Sender. 'No." <> GetCodeunitNumber THEN
311    EXIT;
312
313 IF ExportExcelTemplate THEN BEGIN
314    Handled := TRUE;
315    EXIT;
316 END;
317
318 LOCAL [EventSubscriber] ImprtData (VAR Sender : Record
"Data Migrator Registration";VAR Handled : Boolean)
319 IF Sender. "No." <> GetCodeunitNumber THEN
320    EXIT;
321
322 IF ImportExcelData THEN BEGIN
323    Handled := TRUE;
324    EXIT;
325 END;
326
327 Handled := FALSE;
328
329 LOCAL [EventSubscriber] SelectDataToApply(VAR Sender : Record
"Data Migrator Registration";VAR DataMigrationEntity : Record :
"Data Migration Entity"; VAR
330 IF Sender. "No." <> GetCodeunitNumber THEN
331    EXIT;
```

In this example, code lines 263 and 264 query migration extensions to see what extensions are available. Migration extensions that have subscribed can respond, by calling the appropriate API, to indicate that they are available.

Code lines 266-270 can emit an event querying whether or not migration extensions have settings available. The migration extensions can respond to the event, by calling the appropriate API, indicating whether or not they have settings. Note that while events are generally illustrated in this example, it should be appreciated that event indicators or other indicators may be used to implement embodiments of the invention.

Code lines 272-277 can emit an event to open settings when a migration extension has settings available. In particular, migration extensions, as subscribers to the event, can receive the event and in response provide any settings for the particular migration extension, by calling the appropriate API.

Code lines 279-289 can emit events for validating settings. Migration extensions can respond as event subscribers to validate settings, by calling the appropriate API.

Code lines 291-295 can emit events to migration extensions to identify whether not the migration extensions have templates available. The migration extensions can respond to the events as event subscribers indicating whether or not they have templates for migration, by calling the appropriate APIs.

Code lines 297 through 307 can be used to aim at events for getting instructions from migration extensions. Migration extensions, as event subscribers, can respond with instructions, by calling the appropriate API, which can be displayed to a user as illustrated below.

Code lines 309-316 can be used to emit events for downloading templates from migration extension as events subscribers. In particular, the migration extension can respond to the events and provide any available templates, by calling the appropriate API.

Code lines 318 through 327 can emit the events for importing data. In particular, events can be emitted to migration extensions which can respond with the appropriate data importing actions, by calling the appropriate API.

Code lines 329-331 can be used to emit events to facilitate a user selecting which data to apply to a migration, by a migration extension calling the appropriate API. Various other events although not illustrated here, may be emitted and responded to by migration extensions.

In some embodiments, various data migration extensions appear in a common fashion in a user interface of a system such that each of the data migration extensions and their functionality appears in a way that it is consistent with other data migration extensions and their functionality. This means that new migrations can be added to a multi-tenant system, allowing extension writers to provide these while using common data migration code. Additionally, users will have less confusion when attempting to import data from different systems. In particular, a user will access a consistent interface no matter what type of data and from what other system data is being imported, such that a user can consistently and accurately interact with an import user interface.

Figure 2A:
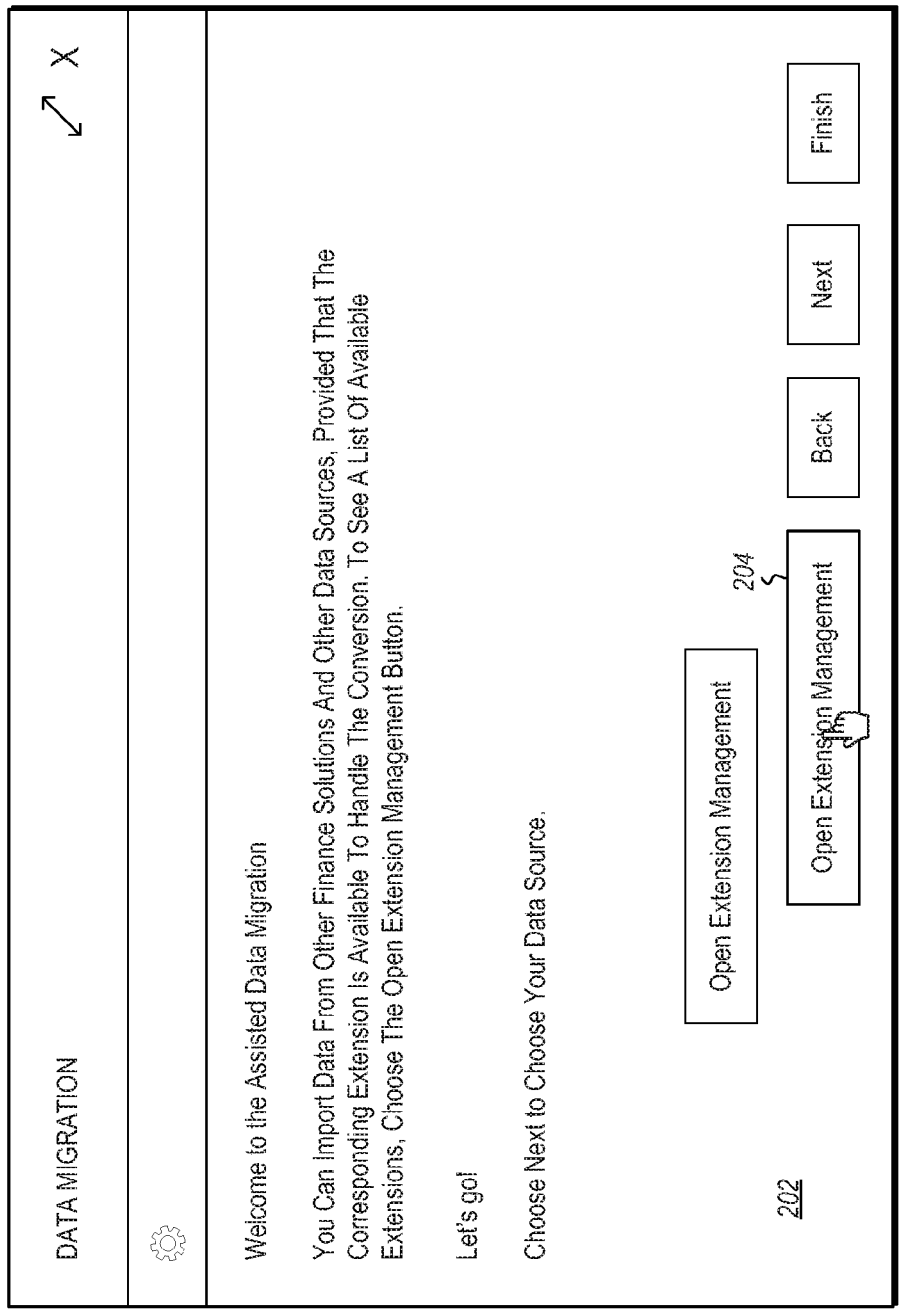
FIG. 2A illustrates user interface details for facilitating data migration.
Figure 2B:
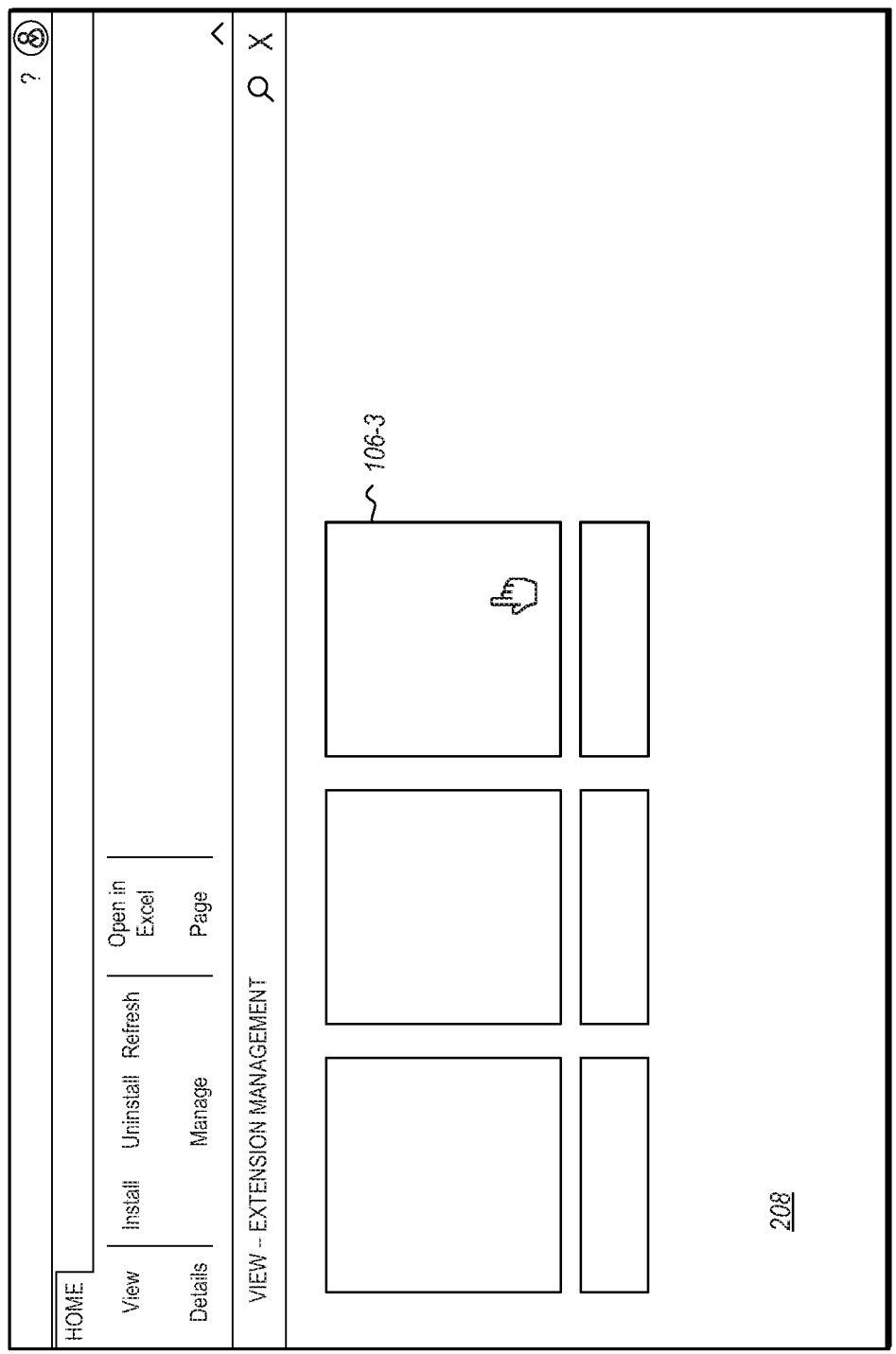
FIG. 2B illustrates additional user interface details for facilitating data migration.
Figure 2C:
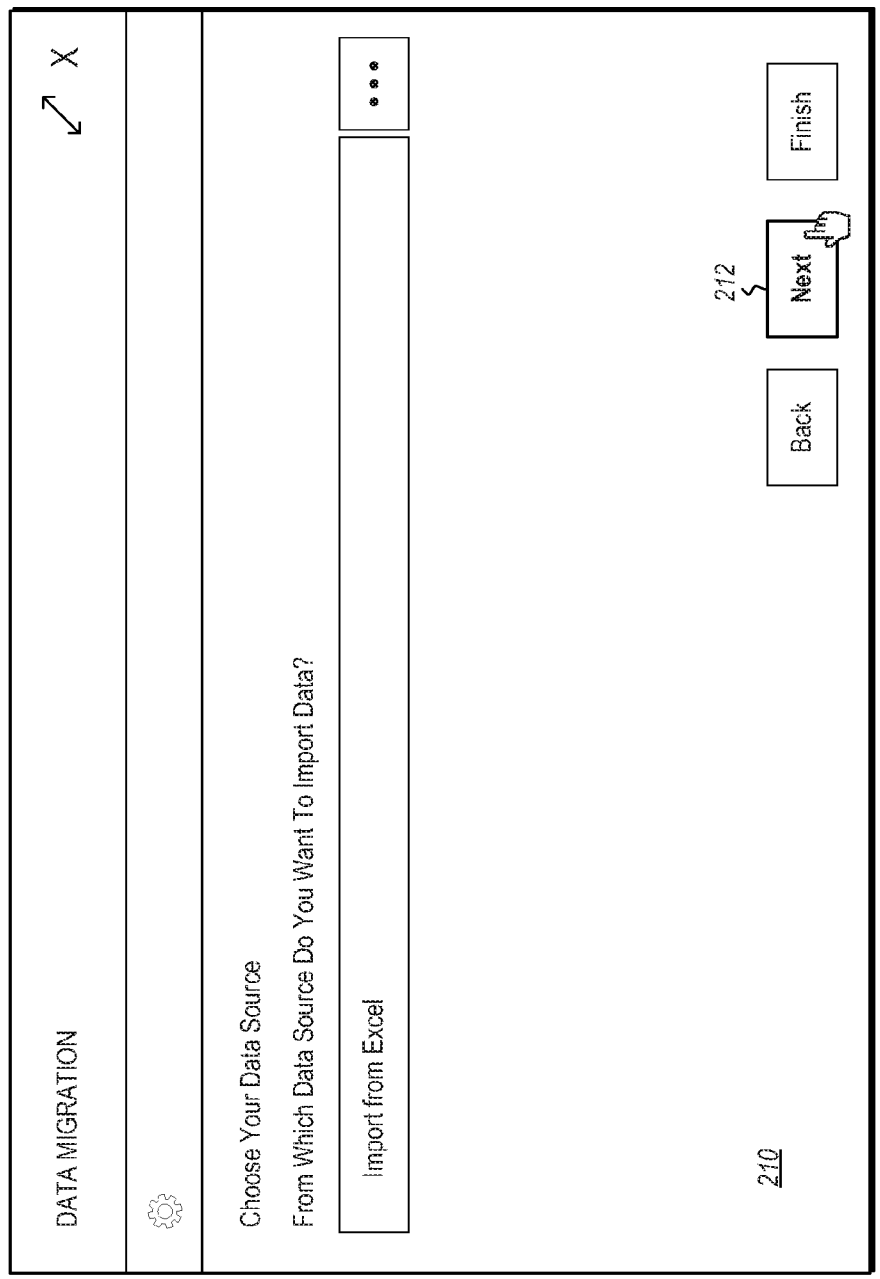
FIG. 2C illustrates additional user interface details for facilitating data migration.
Figure 2D:
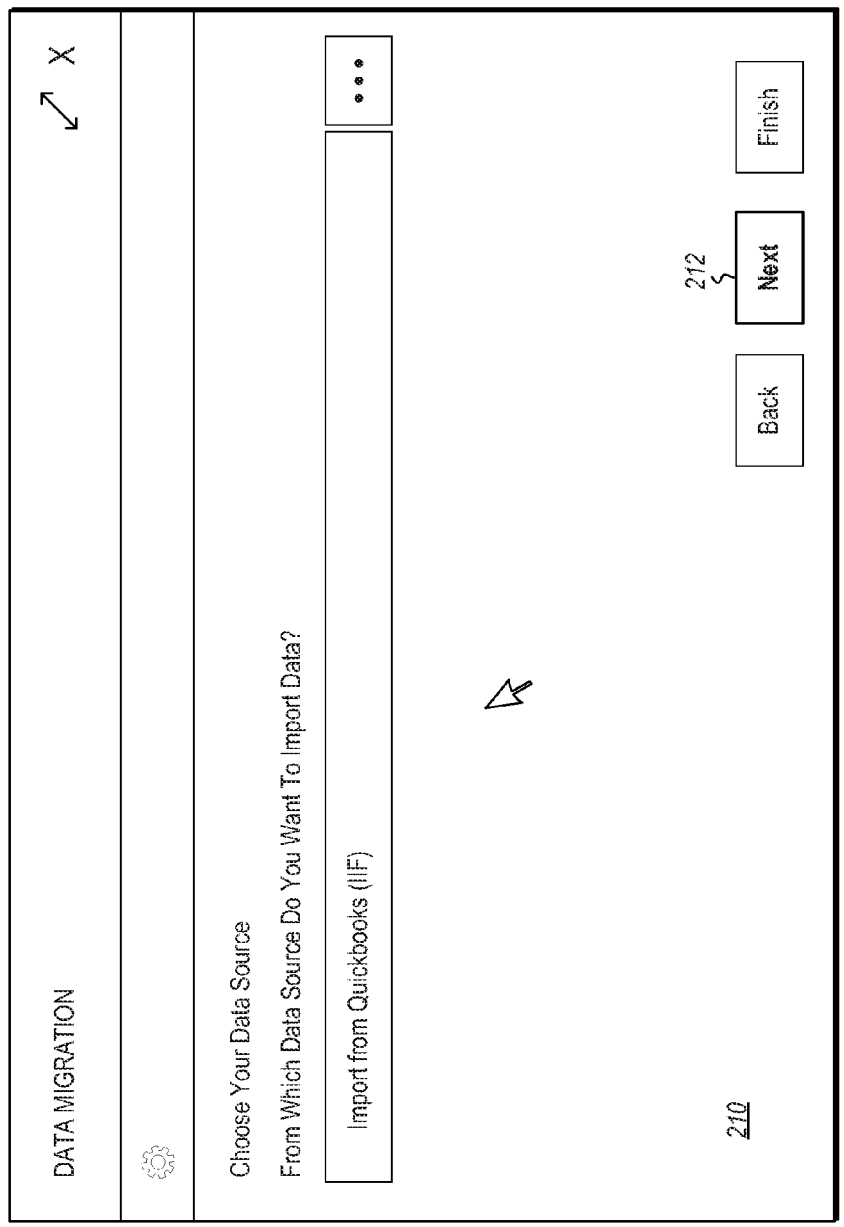
FIG. 2D illustrates additional user interface details for facilitating data migration.
Figure 2E:
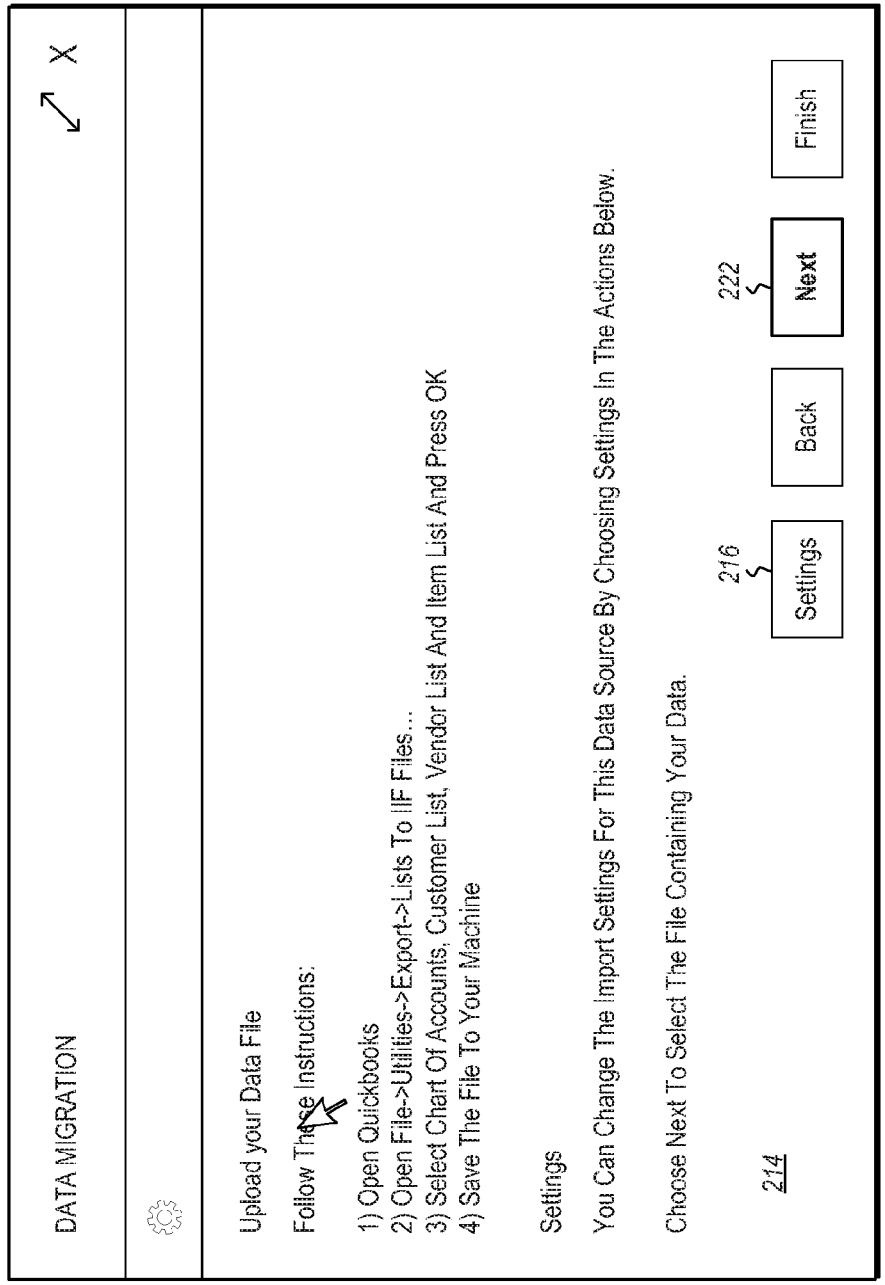
FIG. 2E illustrates additional user interface details for facilitating data migration.

An example is now illustrated with reference to FIG. 2A through FIG. 2K. FIG. 2A illustrates a welcome screen 202 that can be presented to a user when the user desires to import data from another application or system. The welcome screen 202 includes an open extension management button 204. When the user selects the open extension management button 204, a user interface screen 208 is displayed as illustrated in FIG. 2B. The user interface screen 208 shows various migration extensions that can be selected and used by the migration coordinator 102. In the illustrated example, a user selects a migration extension 106-3 which causes the screen 210 to be displayed as illustrated in FIG. 2C. Here, a user can select a data source for import. As illustrated in FIG. 2D, the user selects an appropriate data source to import. The user then selects the next button 212 resulting in the screen 214 illustrated in FIG. 2E to be displayed if migration instructions are available as described below. Otherwise, the screen 224 as illustrated in FIG. 2G will be displayed.

In this example, the migration coordinator 102 will query the migration extension 106-3 through the eventing system previously described to determine if the migration extension 106-3 has settings for a migration. The migration extension 106-3 may include a flag, or other indicator, that indicates whether or not instructions are provided. If the flag indicates that instructions are provided, the migration extension 106-3 can notify the migration coordinator 102 that instructions exist. If the instructions exist, the migration coordinator 102 can, through the eventing system previously described, request the instructions from the migration extension 106-3. The migration extension 106-3 will provide instructions to the migration coordinator 102. The migration coordinator 102 will then display the migration instructions as illustrated in FIG. 2E. The instructions may include instructions provided to a user to indicate to the user in a preconditioning or manual handling of data needed to be performed before the data can be imported into the base system 104 by the migration coordinator 102.

In the illustrated example, the screen 214 also includes a settings button 216 when settings are available from the migration extension 106-3. When a user selects the settings button 216, the screen 218 shown in FIG. 2F will appear. Note that in some embodiments, the migration coordinator 102, before displaying the settings button 216, will query the migration extension 106-3 to determine if settings exist at the migration extension 106-3 through the eventing system, or other indicator providing system, previously described. If the migration extension 106-3 indicates that settings stexist at the migration extension 106-3 to the migration coordinator 102, the migration coordinator 102 will render the settings button 216. If the migration extension 106-3 indicates that no settings exist at the migration extension 106-3, then the migration coordinator 102 will not render the settings button 216. In an alternative embodiment, if no settings exist at the migration extension 106-3, then the migration coordinator 102 may render the settings button 216, but in a grayed out or otherwise inaccessible fashion.

Figure 2F:
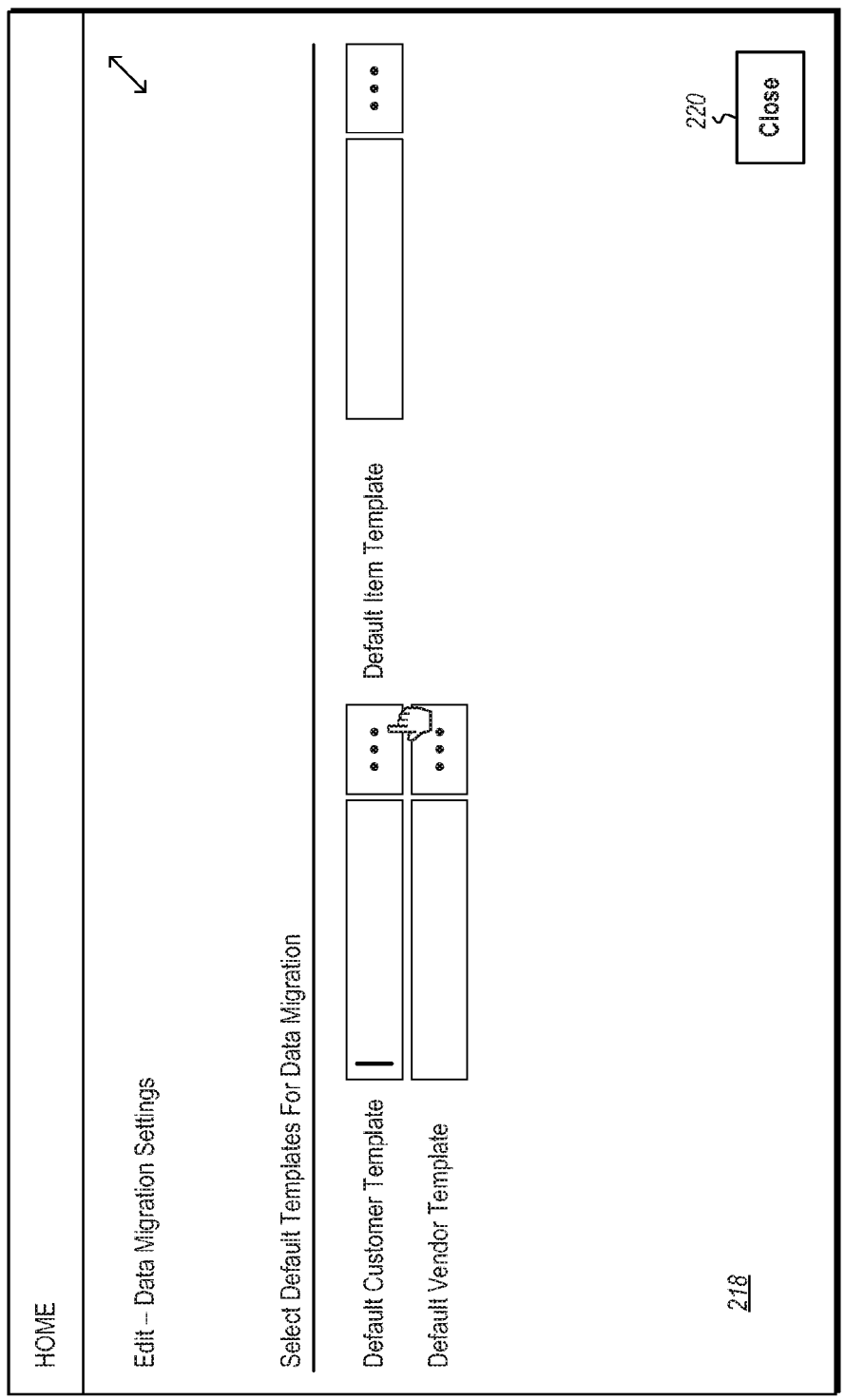
FIG. 2F illustrates additional user interface details for facilitating data migration.
Figure 2G:
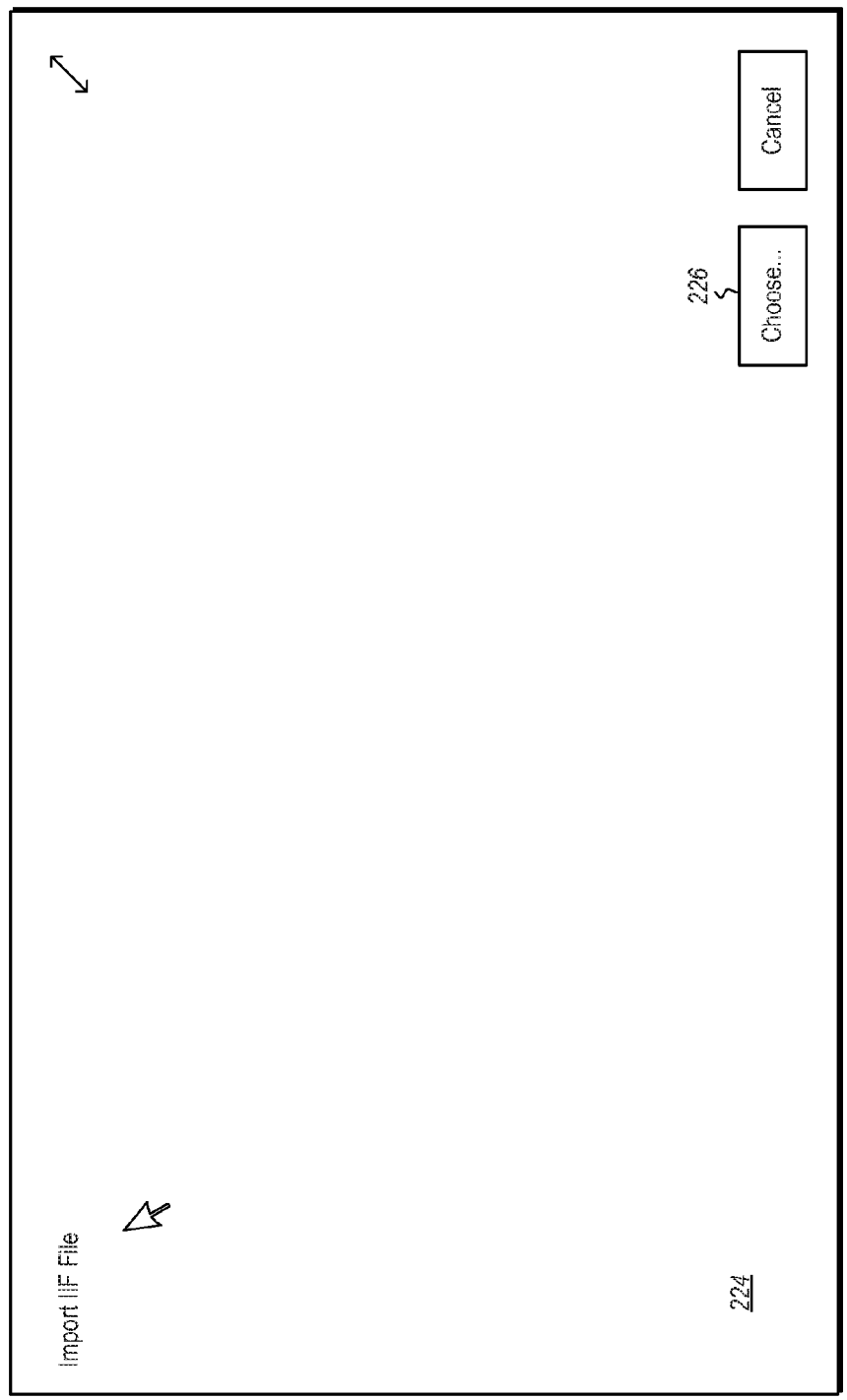
FIG. 2G illustrates additional user interface details for facilitating data migration.

When the user selects the settings button 216, the screen 218 as illustrated in FIG. 2F is displayed allowing the user to input various settings in the user interface of the migration coordinator 102. Once the settings are entered in the screen 218, the user can select a close button 220 followed by selecting the next button 222 illustrated in FIG. 2E. This causes the screen 224 to be displayed which allows a user to choose a file to import. The user can select the choose button 226 which provides an interface that allows the user to select a file for import. Once this file is selected, the user again selects the button 222 which displays the screen 228, as shown in FIG. 2H. The screen 228 is populated based on data in the file selected by the user. Here a user can select what data elements to import.

The user can select an advanced button 221 which can provide the user with an interface to allow the user to enter additional advanced settings for importing data. In some embodiments, the advanced button 221 is only displayed as an accessible button when it can be determined that advance setting functionality exists at the migration extension 106-3. For example, using the eventing system previously described, the migration coordinator 102 can query the migration extension 106-3 to determine if advanced settings exist at the migration extension 106-3. If advanced settings exist that the migration extension 106-3, the advanced button 221 will be displayed to allow user to select the advanced button 221. Otherwise, the advanced button 221 will not be displayed or will be displayed in a fashion that makes it inaccessible to a user. If the user selects the advanced button 221, the migration coordinator 102 can use the eventing system to obtain information about the advanced settings available to a user from the migration extension 106-3. As with other user interface elements discussed herein, these advanced settings options can be displayed to a user in a consistent fashion, irrespective of what migration extension is being used.

Figure 2I:
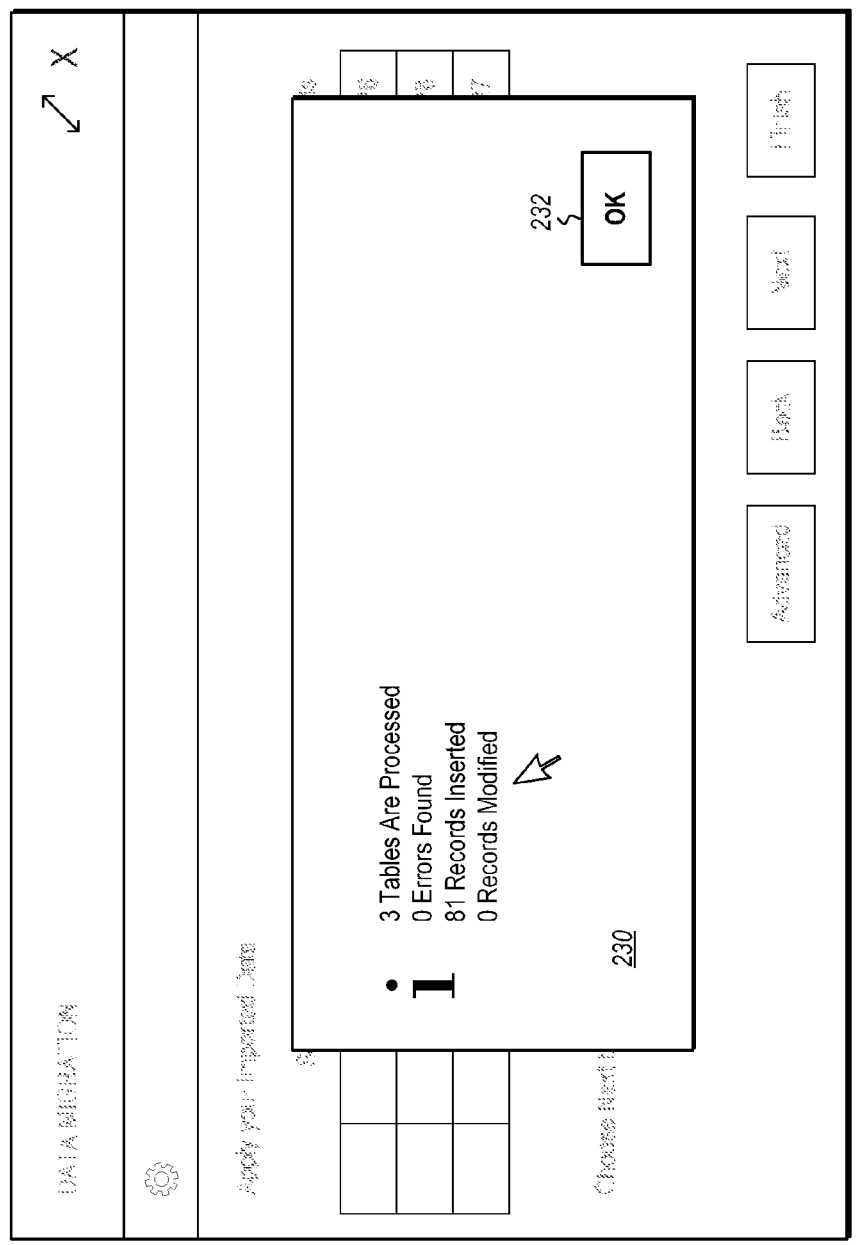
FIG. 2I illustrates additional user interface details for facilitating data migration.

The user again selects the next button 222 causing the screen 230, as shown in FIG. 2I to be displayed where the screen 230 summarizes the results of the import operation. The user then selects the OK button 232 shown in the screen 230.

The migration coordinator 102, at this point, can query the migration extension 106-3, using the eventing system, or other indicator providing system, previously described, to determine if any migration templates exist either at the migration extension 106-3 or in another location that can be identified by the migration extension 106-3. A migration template may be a schema that identifies data organization and/or mappings of data to be migrated. If a migration template exists, the migration coordinator 102 can obtain the migration template which can then be used by the migration coordinator 102 to import any data indicated by the user. In some embodiments, the migration extension 106-3 will indicate that no migration templates exist. For example, this may occur when the instructions illustrated in screen 214 are sufficient to import the data into the system 104.

Figure 2J:
FIG. 2J illustrates additional user interface details for facilitating data migration.

Once data has been imported, the screen 234 as shown in FIG. 2J is displayed indicating that the data migration has been completed. The user can then click the finish button 236 which closes the wizard and allows the user to view the imported data as illustrated in the screen 238 shown in FIG. 2K.

Some embodiments may implement migration to a common data format. Thus for example, some embodiments may import data (when using RapidStart configuration packages for Dynamics NAV available from Microsoft Corporation, of Redmond, Wash.) into RapidStart configuration packages for data migrated from other systems. Data consistency code can thus be written once for all data migration extensions.

As illustrated above, migration coordination can be implemented using eventing. Embodiments can use event-based, or other indicator, coordination such that an installed extension appears in a migration user interface of the base system 104 in a consistent way and such that information specific to a previous system (such as instructions on how to migrate) is provided by the extension on an as-needed basis. This means that migrations can be dynamically added and removed The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
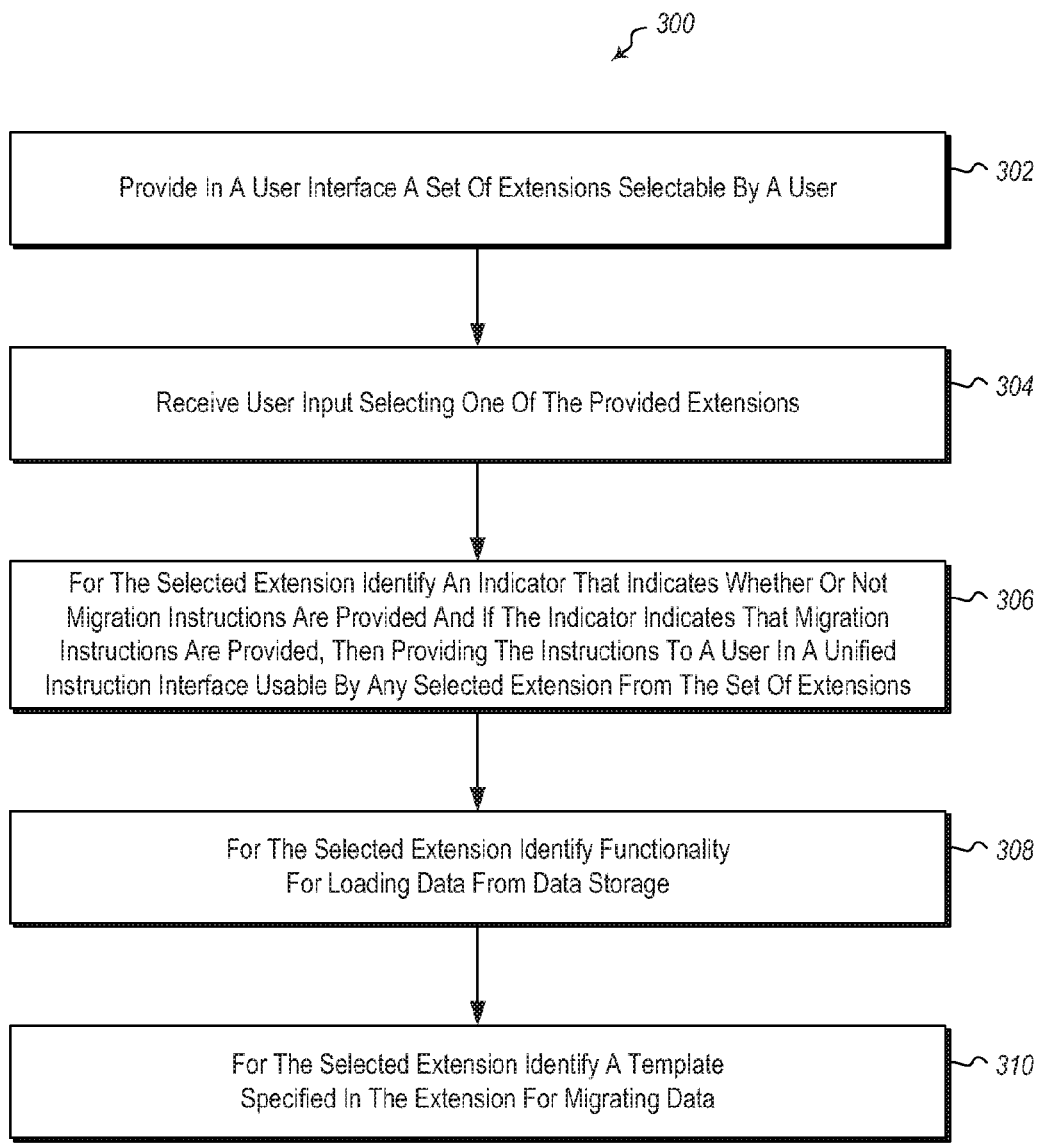
FIG. 3 illustrates a method of migrating data from a first system format to a second system.

Referring now to FIG. 3, a method 300 is illustrated. The method 300 may be practiced in a computing environment. The method includes acts for migrating data from a first system format to a second system. The method includes providing in a user interface a set of extensions selectable by a user (302). For example, FIG. 2B illustrates a screen 208 where various migration extensions are provided in a user interface to a user.

The method 300 further includes receiving user input selecting one of the provided extensions (304). For example, FIG. 2B illustrates that a user selects a migration extension 106-3.

The method 300 further includes, for the selected extension identifying an indicator that indicates whether or not migration instructions are provided and if the indicator indicates that migration instructions are provided, then providing the instructions to a user in a unified instruction interface usable by any selected extension from the set of extensions (306). For example, FIG. 2E illustrates that the migration coordinator 102 can determine if the migration extension 106-3 includes instructions, and if the migration extension 106-3 includes instructions then the instructions are displayed in the user interface at the screen 214.

The method 300 further includes, for the selected extension identifying functionality for loading data from data storage (308). For example, as illustrated in FIG. 2D, the screen 210 is illustrated and helps to provide functionality as described above for allowing a user to select a file to load from data storage.

The method 300 further includes, for the selected extension identifying a template specified in the extension for migrating data (310). For example, embodiments can identify templates used to import data.

When setting are available for the identified template, the method includes providing a settings interface to the user in a unified settings interface usable by any selected extension in the set of extensions to allow the user to enter settings for migrating data. For example, as illustrated in FIG. 2F, a user interface screen 218 may be provided to allow user to enter settings information.

The method 300 is practiced where the data is transformed into an intermediate format according to the template in view of any setting configured in the settings interface. The data in the intermediate format can be evaluated to determine if data passes migration checks.

The method 300 may further include displaying a view of the transformed data. An example of this is illustrated in FIG. 2K.

The method 300 may further include displaying one or more errors in the transformed data.

The method 300 may further include identifying whether or not error handling has been specified for the selected extension and when error handling has been specified for the selected extension handling errors in a fashion specified in the error handling. In particular, in some embodiments, the migration extension 106-3 may identify functionality for identifying and surfacing errors to a user in the user interface of the migration coordinator 102. This error handling can be identified through the eventing system previously described herein.

The method 300 may further include identifying whether or not advanced settings have been specified for the selected extension and when advanced settings have been specified for the selected extension providing user interface elements to allow a user to configure advanced settings.

Figure 4:
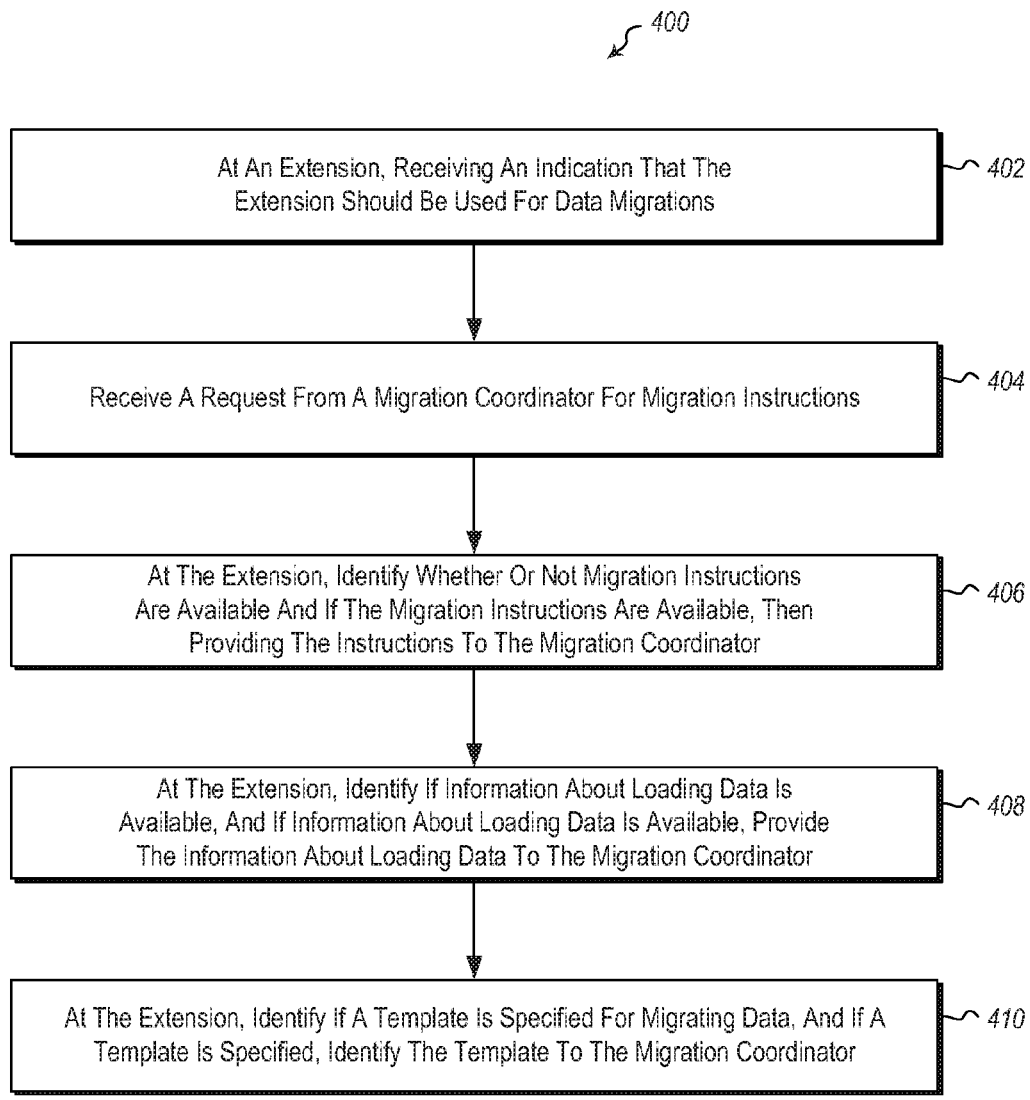
FIG. 4 illustrates another method of migrating data from a first system format to a second system.

Referring now to FIG. 4, a method 400 is illustrated the method 400 may be practiced in a computing environment and includes acts for facilitating migration of data from a first system format to a second system. The method 400 includes, at an extension, receiving an indication that the extension should be used for data migrations (act 402).

The method 400 further includes, receiving a request from a migration coordinator for migration instructions (act 404). This could include receiving a request asking if there are instructions, or simply a request asking for the instructions.

The method 400 further includes, at the extension, identifying whether or not migration instructions are available and if the migration instructions are available, then providing the instructions to the migration coordinator (act 406). The instructions may ultimately be provided to a user by the migration coordinator. The extension could simply provide a nack indicating that there are no instructions.

The method 400 further includes at the extension, identifying if information about loading data is available, and if information about loading data is available, providing the information about loading data to the migration coordinator (act 408).

The method 400 further includes, at the extension, identifying if a template is specified for migrating data, and if a template is specified, identifying the template to the migration coordinator (act 410).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
one or more processors; and
one or more computer-readable media having stored thereon instructions that are executable by the one or more processors to configure the computer system to migrate data from a first system format to a second system, including instructions that are executable to configure the computer system to perform at least the following:
provide in a user interface a plurality of extensions;
receive user input selecting one of a provided extension from the plurality of extensions;
receive, from the selected extension, a subscription for events;
as a result of the subscription, publish an event to the selected extension query whether or not user implemented migration instructions are available;
receive a response from the selected extension indicating that migration instructions are available
as a result of receiving a response from the selected extension, publish an event to the selected extension requesting the migration instruction;
receive the instructions from the selected extension;
as a result of receiving the instructions, provide the instructions to the user interface in a unified instruction interface usable by any selected extension, and consistent among the extensions in the set of extensions, from the set of extensions;
for the selected extension identify functionality for loading data from data storage;
for the selected extension identify a template specified in the extension for migrating data;
publish a subscription event to the selected extension querying whether or not user configurable settings are available for the identified template;
receive a response from the selected extension indicating that user configurable settings are available for the identified template;
publish an event to obtain the settings;
provide, in the user interface, a settings interface in a unified settings interface usable by any selected extension in the set of extensions to allow user input values for the settings for migrating data; and
wherein the data is transformed into an intermediate format describing which table and which column values should be inserted, according to the template in view of any settings configured in the settings interface.

2. The system of claim 1, wherein one or more computer-readable media further have stored thereon instructions that are executable by the one or more processors to configure the computer system to display a view of the transformed data.

3. The system of claim 1, wherein one or more computer-readable media further have stored thereon instructions that are executable by the one or more processors to configure the computer system to display one or more errors in the transformed data.

4. The system of claim 1, wherein one or more computer-readable media further have stored thereon instructions that are executable by the one or more processors to configure the computer system to identify whether or not error handling has been specified for the selected extension and when error handling has been specified for the selected extension, handle errors in a fashion specified in the error handling.

5. The system of claim 1, wherein one or more computer-readable media further have stored thereon instructions that are executable by the one or more processors to configure the computer system to identify whether or not advanced settings have been specified for the selected extension and when advanced settings have been specified for the selected extension, provide user interface elements to allow a user to configure advanced settings.

6. The system of claim 1, wherein one or more computer-readable media further have stored thereon instructions that are executable by the one or more processors to configure the computer system to publish an event from a migration coordinator to migration extensions subscribing to the migration coordinator to receive events to identify data migrators available from the migration extensions.

7. The method of claim 1, wherein at least one of: identifying an indicator that indicates whether or not migration instructions are provided; identifying functionality for loading data from data storage; identifying a template specified in the extension for migrating data; or identifying an indicator that indicates whether or not settings are available for the identified template comprises publishing an event from a migration coordinator to migration extensions subscribing to the migration coordinator to receive events.

8. In a computing environment, a method of migrating data from a first system format to a second system, the method comprising:
providing in a user interface a plurality of extensions;
receiving user input selecting one of a provided extension from the plurality of extensions;
receiving, from the selected extension, a subscription for events;

as a result of the subscription, publish an event to the selected extension querying whether or not user implemented migration instructions are available;
receiving a response from the selected extension indicating that migration instructions are available;
as a result of receiving a response from the selected extension, publishing an event to the selected extension requesting the migration instruction;
receiving the instructions from the selected extension;
as a result of receiving the instructions, providing the instructions to the user interface in a unified instruction interface usable by any selected extension, and consistent among the extensions in the set of extensions, from the set of extensions;
for the selected extension identifying functionality for loading data from data storage;
for the selected extension identifying a template specified in the extension for migrating data;
publishing a subscription event to the selected extension querying whether or not user configurable settings are available for the identified template;
receiving a response from the selected extension indicating that user configurable settings are available for the identified template;
publishing an event to obtain the settings;
receiving the settings from the selected extension;
providing, in the user interface, a settings interface in a unified settings interface usable by any selected extension in the set of extensions to allow user input of values for the settings for migrating data; and
wherein the data is transformed into an intermediate format describing which table and which column values should be inserted, according to the template in view of any settings configured in the settings interface.

9. The method of claim 8, further comprising displaying a view of the transformed data.

10. The method of claim 8, further comprising displaying one or more errors in the transformed data.

11. The method of claim 8, further comprising identifying whether or not error handling has been specified in an event for the selected extension and when error handling has been specified in an event for the selected extension handling errors in a fashion specified in the error handling.

12. The method of claim 8, further comprising identifying whether or not advanced settings have been specified in an event for the selected extension and when advanced settings have been specified in an event for the selected extension providing user interface elements to allow a user to configure advanced settings.

13. The method of claim 8, further comprising publishing an event from a migration coordinator to migration extensions subscribing to the migration coordinator to receive events to identify data migrators available from the migration extensions.

14. The method of claim 8, wherein at least one of: identifying an event that indicates whether or not migration instructions are provided; identifying functionality for loading data from data storage; identifying a template specified in the extension for migrating data; or identifying an event that indicates whether or not settings are available for the identified template comprises publishing an event from a migration coordinator to migration extensions subscribing to the migration coordinator to receive events.

15. In a computing environment, a method of facilitating migration of data from a first system format to a second system, the method comprising:
at an extension, subscribe to a migration coordinator for events;
at the extension receiving published event indicating that the extension should be used for data migrations;
receiving an event from the migration coordinator for migration instructions;
at the extension, identifying that migration instructions are available;
as a result, providing the instructions to the migration coordinator;
receiving an event from the migration coordinator requesting information about loading data;
at the extension, identifying information about loading data;
as a result, providing the information about loading data to the migration coordinator;
receiving an event from the migration coordinator for templates for migrating data;
at the extension, identifying that a template is specified for migrating data; and
as a result, identifying the template to the migration coordinator.

16. The method of claim 15, further comprising:
receiving an event from the migration coordinator for error handling information;
at the extension, identifying that error handling information is available at the extension; and
as a result, providing the error handling information to the migration coordinator.

17. The method of claim 15, further comprising:
receiving an event from the migration coordinator for advanced settings information;
identifying that advanced settings information is available at the extension; and
as a result, providing the advanced settings information to the migration coordinator.

18. The method of claim 15, further comprising receiving an event from the migration coordinator to identify data migrators available from the migration extension.

* * * * *